US008033107B2

(12) United States Patent
Tikkanen

(10) Patent No.: US 8,033,107 B2
(45) Date of Patent: Oct. 11, 2011

(54) HYDROSTATIC DRIVE HAVING VOLUMETRIC FLOW EQUALISATION

(75) Inventor: Seppo Tikkanen, Ulm (DE)

(73) Assignee: Brueninghaus Hydromatik GmbH, Elchingen (DE)

( * ) Notice: Subject to any disclaimer, the term of this patent is extended or adjusted under 35 U.S.C. 154(b) by 536 days.

(21) Appl. No.: 12/280,943

(22) PCT Filed: Jun. 1, 2007

(86) PCT No.: PCT/EP2007/004886

§ 371 (c)(1),
(2), (4) Date: Aug. 27, 2008

(87) PCT Pub. No.: WO2007/140947

PCT Pub. Date: Dec. 13, 2007

(65) Prior Publication Data

US 2009/0064676 A1 Mar. 12, 2009

(30) Foreign Application Priority Data

Jun. 2, 2006 (DE) ......................... 10 2006 025 987

(51) Int. Cl.
*F16D 31/02* (2006.01)

(52) U.S. Cl. ................. 60/464; 60/475; 60/476; 60/486

(58) Field of Classification Search .................... 60/414, 60/464, 473, 475, 476, 486
See application file for complete search history.

(56) References Cited

U.S. PATENT DOCUMENTS

| | | | | |
|---|---|---|---|---|
| 3,903,698 | A * | 9/1975 | Gellatly et al. | 60/476 |
| 4,961,316 | A * | 10/1990 | Corke et al. | 60/475 |
| 5,179,836 | A * | 1/1993 | Dantlgraber | 60/475 |
| 7,234,298 | B2 * | 6/2007 | Brinkman et al. | 60/475 |
| 2002/0189250 | A1 | 12/2002 | Bruun | |
| 2003/0097837 | A1 * | 5/2003 | Hiraki et al. | 60/486 |

FOREIGN PATENT DOCUMENTS

| | | |
|---|---|---|
| DE | 1 601 732 | 12/1970 |
| DE | 103 43 016 A1 | 5/2005 |
| EP | 1 607 305 A2 | 12/2005 |
| JP | 58-102806 | 6/1983 |
| JP | 1-280132 | 5/1988 |

OTHER PUBLICATIONS

International Preliminary Report on Patentability issued on Jan. 22, 2009 in connection with International Application PCT/EP2007/004886, of which the above-identified application is a national entry.

* cited by examiner

*Primary Examiner* — Michael Leslie
(74) *Attorney, Agent, or Firm* — Scully, Scott, Murphy & Presser, P.C.

(57) ABSTRACT

A hydrostatic drive with first and second hydraulic pumps and a dual-acting hydraulic cylinder. The dual-acting hydraulic cylinder has a first working chamber defined by a first piston surface and a second working chamber defined by a second piston surface. The first working chamber is connected to first connections of the first and second hydraulic pumps. The second working chamber is connected to a second connection of the second hydraulic pump. A second connection of the first hydraulic pump is connected to a hydraulic fluid reservoir. The ratio of the first piston surface to the second piston surface differs from the ratio of the total delivery volume of the two hydraulic pumps relative to the delivery volume of the second hydraulic pump. A tapping valve for removing hydraulic fluid is provided for the volumetric flow equalisation.

15 Claims, 4 Drawing Sheets

HYDROSTATIC DRIVE HAVING VOLUMETRIC FLOW EQUALISATION

BACKGROUND

The invention relates to a hydrostatic drive comprising a dual-acting hydraulic cylinder and volumetric flow equalisation.

It is known from DE 103 43 016 A1 to actuate a dual-acting hydraulic cylinder by means of a first hydraulic pump and a second hydraulic pump. One of the two hydraulic pumps is, in this case, connected to the two working chambers of the dual-acting hydraulic cylinder in a closed circuit. The second hydraulic pump is, however, only connected to the working chamber on the piston side, in an open circuit. The two hydraulic pumps are respectively able to be adjusted in their delivery volume. By setting a corresponding delivery volume ratio, the different volumetric flows in the working chamber on the piston side and the working chamber on the piston rod side are taken into account.

A drawback with the hydrostatic drive known from DE 103 43 016 A1 is that the ratio between the sum of the delivery volumes of the two hydraulic pumps and the delivery volume of the hydraulic pump in the closed circuit respectively has to remain at the same ratio as the piston surfaces of the working piston relative to one another. If, as a result, two identical hydraulic pumps are used, the respective delivery volume thereof has to be set by the appropriate adjusting devices, so that said condition is fulfilled. In contrast, it is necessary when using two identical hydraulic pumps, as may be implemented advantageously by using a double pump, to use a dual-acting hydraulic cylinder, the piston surfaces thereof having an appropriate ratio. Generally, the two hydraulic pumps of a double pump unit are configured to be identical, so that the area ratio of the two piston surfaces would have to be 2:1. Conventional dual-acting hydraulic cylinders, however, generally have an area ratio of the piston surfaces which differs therefrom and thus different volumetric flows when displacing the working piston.

SUMMARY

It is the object of the invention to provide a hydrostatic drive which allows a substantially free selection of the hydraulic cylinder to be used, where there is a predetermined fixed delivery ratio of a first and a second hydraulic pump.

According to the invention, the object is achieved in that a tapping valve is provided for the volumetric flow equalisation. The hydrostatic drive comprises a first hydraulic pump and a second hydraulic pump and a dual-acting hydraulic cylinder. The respective first connections of the first and the second hydraulic pumps are both connected to a first working chamber of the hydraulic cylinder. In contrast, only the second connection of the second hydraulic pump is connected to a second working chamber. The second connection of the first hydraulic pump is, however, connected to a hydraulic fluid reservoir. For producing a movement of the working piston, both hydraulic pumps jointly supply hydraulic fluid into the first working pressure chamber. In the reverse delivery direction, and thus the reverse direction of movement of the working piston, hydraulic fluid is merely delivered into the second working chamber by the second hydraulic pump. The ratio of the total delivery volume of both hydraulic pumps to the delivery volume of the second hydraulic pump may differ from the area ratio of the first piston surface relative to the second piston surface. As a result, it may lead to a difference in the balance of the amount of oil. According to the invention, a tapping valve is provided by means of which said difference in the balance of the amount of oil is equalised and hydraulic fluid is withdrawn in a first delivery direction and thus a volumetric flow equalisation is achieved. Preferably the tapping valve connects the first working chamber or the second working chamber to a hydraulic fluid reservoir.

In this connection, it is particularly advantageous to provide a flush valve as a tapping valve. The flush valve is arranged, depending on the pressures in the first and/or the second working chamber, such that it connects the second or the first working chamber to the hydraulic fluid reservoir. A volumetric flow equalisation by removing hydraulic fluid may be carried out, therefore, by means of the flush valve on the respective side of the hydrostatic drive connected to the current suction side of the hydraulic pump.

In this connection, a feed device may advantageously be used in order to connect the first or the second working chamber to the hydraulic fluid reservoir.

In the reverse delivery direction of the hydrostatic drive, in order to increase the insufficient volumetric flow, preferably a feed pump is provided. Said feed pump delivers, in particular on the suction side of the first and the second hydraulic pump, an amount of hydraulic fluid required for volumetric flow equalisation into the hydrostatic circuit of the hydrostatic drive. Particularly preferably, the delivery volume of both the first and the second hydraulic pumps may be set. They both form, in particular, a hydraulic pump unit, such a hydraulic pump unit particularly preferably being a double pump, both hydraulic pumps thereof having an identical delivery volume which may be set.

According to a preferred embodiment, the tapping valve is connected via a first working line and/or via a second working line to the first and/or to the second working chamber and at least in one of the two working lines a load maintaining valve is provided, by means of which the working piston of the hydraulic cylinder may be fixed in a specific position. To this end, the load maintaining valve interrupts the working line preferably in at least one direction, so that hydraulic fluid is prevented from flowing out of the first working chamber and/or the second working chamber.

It is particularly advantageous if at least one load maintaining valve may be moved into its open position by using an actuating pressure of an adjusting device. To this end, the actuating pressure is withdrawn from the adjusting device in order to set the delivery volume of the first hydraulic pump and the second hydraulic pump. The piloting of the load maintaining valve, therefore, takes place automatically depending on the delivery direction.

A pressure-compensated load maintaining valve is preferably used in order to keep the required actuating forces and thus the actuating pressures low. The actuating pressures are generally lower by an order of magnitude than the achievable working pressures.

According to a further preferred embodiment, the hydraulic fluid reservoir is designed as a hydraulic accumulator. The use of a hydraulic accumulator as a hydraulic fluid reservoir makes it possible, for example, to recover a portion of the energy used when actuating the hydraulic cylinder, for example when lifting a load and subsequently thereto when lowering the load. Additionally, such a hydraulic accumulator offers the advantage that the hydraulic fluid stored therein is at a pressure which prevents the possible occurrence of cavitation on the suction side of the hydraulic pump attached thereto. In order to prevent an unnecessary pressure loss, the connection between the hydraulic accumulator and the first hydraulic pump is preferably provided with a non-return valve, which may be acted upon by an actuating pressure of the adjusting device and thus may be adjusted between its open and closed position. The actuation again takes place automatically by using the actuating pressure and by taking into account the delivery direction.

A particularly compact arrangement results, if at least the tapping valve and/or the at least one load maintaining valve and/or the non-return valve are arranged in a pump unit which comprises the first and the second hydraulic pump.

BRIEF DESCRIPTION OF THE DRAWINGS

Preferred embodiments of the hydrostatic drive according to the invention are shown in the drawings and are described in the following description in more detail, in which.

DETAILED DESCRIPTION OF EXEMPLARY EMBODIMENTS

Figure 1:
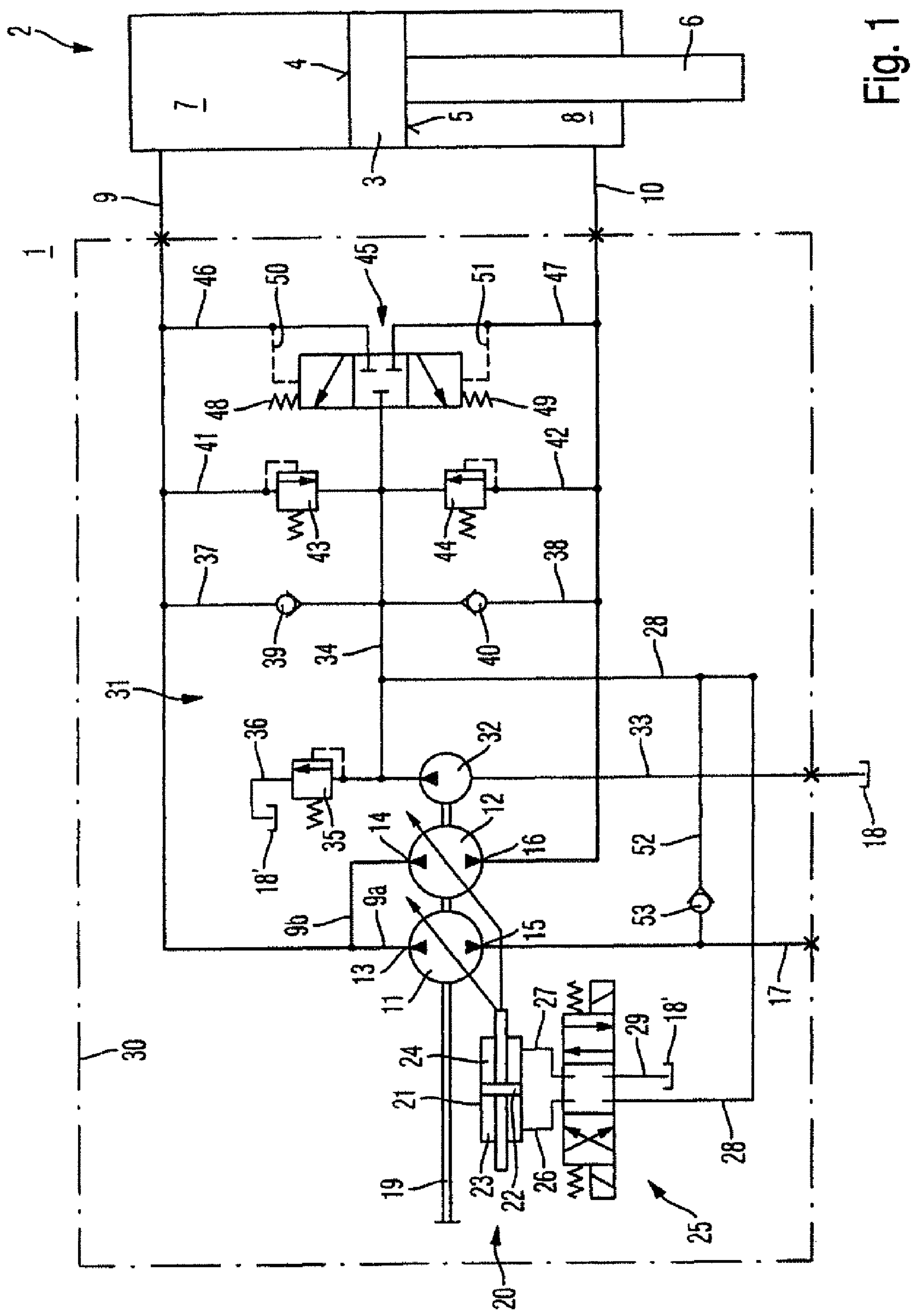
FIG. 1 shows a first embodiment of a hydrostatic drive according to the invention.

The hydrostatic drive 1 shown in FIG. 1 comprises a dual-acting hydraulic cylinder 2 in which a working piston 3 is displaceably arranged. The working piston 3 comprises a first piston surface 4 and a second piston surface 5. The first piston surface 4 and the second piston surface 5 are oriented in opposing directions. On the side of the second piston surface 5 a piston rod 6 is connected to the working piston 3. As a result, the second piston surface 5 is smaller than the first piston surface 4.

The first piston surface 4 may be acted upon in a first working chamber 7 of the hydraulic cylinder 2 by a first working pressure acting there. Accordingly, the second piston surface 5 may be acted upon in a second working chamber 8 of the hydraulic cylinder 2 by a second working pressure. The first working chamber 7 is connected to a first working line 9 and the second working chamber 8 is connected to a second working line 10.

To generate volumetric flows for actuating the hydraulic cylinder 2, a first hydraulic pump 11 and a second hydraulic pump 12 are provided. The first hydraulic pump 11 and the second hydraulic pump 12 are, according to a preferred embodiment, implemented in the form of a double pump, so that the adjustment of the delivery volume of the first hydraulic pump 11 and the second hydraulic pump 12 takes place together. The first hydraulic pump 11 and the second hydraulic pump 12 are connected by their respective first connection 13 and/or 14 via the first working line 9 to the first working chamber 7. The first working line 9 is divided in the direction of the first and the second hydraulic pump 11, 12 into a first working line branch 9*a* and a second working line branch 9*b*. The first working line branch 9*a* is connected to the first connection 13 of the first hydraulic pump 11. Accordingly, the second working line branch 9*b* is connected to the first connection 14 of the second hydraulic pump 12.

Whilst the first connections 13, 14 of the first hydraulic pump 11 and the second hydraulic pump 12 are connected in parallel to the first working chamber 7, the respective second connections 15, 16 of the first hydraulic pump 11 and the second hydraulic pump 12 are not both connected to the second working chamber 8. Only the second connection 16 of the second hydraulic pump 12 is connected to the second working chamber 8. Thus a closed hydraulic circuit results, which connects the first working chamber 7 and the second working chamber 8 via the second hydraulic pump 12.

The first working chamber 7 is, however, additionally arranged in an open circuit via the first working line 9 and the first hydraulic pump 11. The second connection 15 of the first hydraulic pump 11 is, to this end, able to be connected to a tank volume 18 via a suction line 17.

The first hydraulic pump 11 and the second hydraulic pump 12 are driven via a common drive shaft 19 by a drive machine, not shown. For setting the first delivery volume of the first hydraulic pump 11 and the second delivery volume of the second hydraulic pump 12, the respective adjusting mechanisms of the first hydraulic pump 11 and the second hydraulic pump 12 are connected to an adjusting device 20. The adjusting device 20 comprises an actuating cylinder 21 in which an actuating piston 22 is displaceably arranged. The actuating piston 22 is acted upon by a first actuating pressure in a first actuating pressure chamber 23 of the actuating cylinder 21 and a second actuating pressure in a second actuating pressure chamber 24 in the opposing direction. As a result of the adjusted force difference acting on the actuating piston 22, the delivery volumes of the first hydraulic pump 11 and the second hydraulic pump 12 are mutually altered. The set delivery volumes of the first hydraulic pump 11 and the second hydraulic pump 12 are, in this case, always in a fixed predetermined ratio relative to one another. In the preferred embodiment of the first hydraulic pump 11 and the second hydraulic pump 12, together in the form of a double pump, the delivery volume of the first hydraulic pump 11 is, in particular, the same as the delivery volume of the second hydraulic pump 12.

For setting the first actuating pressure and the second actuating pressure in the first actuating pressure chamber 23 and/or the second actuating pressure chamber 24, an actuating pressure regulating valve 25 is provided. The actuating pressure regulating valve 25 in the embodiment shown is a 4/3-way valve, which is centred by a set of springs. From this centred position, in which all four connections of the actuating pressure regulating valve 25 are separated from one another, the actuating pressure regulating valve 25 may be deflected in the direction of a first end position or in the direction of a second end position by electromagnets. Depending on the setting of the actuating pressure regulating valve 25 a first actuating pressure line 26 or a second actuating pressure line 27 may be connected to a first connecting line 28 or a relief line 29. The first actuating pressure line 26 is connected to the first actuating pressure chamber 23. The second actuating pressure line 27 is connected to the second actuating pressure chamber 24. Depending on the setting of the actuating pressure regulating valve 25, as a result the first actuating pressure chamber 23 is acted upon by an actuating pressure via the first connecting line 28 and the second actuating pressure chamber 24 is relieved via the second actuating pressure chamber 27 into an inner tank volume 18', which is preferably connected to the tank volume 18. With the reverse actuation of the actuating pressure regulating valve 25, however, the second actuating pressure chamber 24 is connected to the first connecting line 28 and the first actuating pressure chamber 23 is connected to the relief line 29.

The maximum available actuating pressure is supplied to the actuating pressure regulating valve 25 in the aforementioned manner via the first connecting line 28. Additionally to the first hydraulic pump 11 and the second hydraulic pump

12, which in the aforementioned manner are preferably designed as double pumps, the hydraulic pump unit 30 thus formed additionally comprises a feed device 31 with a feed pump 32. The feed device 31 serves to re-supply hydraulic fluid which has escaped as a result of leakage from the circuit, as well as producing an initial pressure during operation of the drive 1. The feed pump 32 is also connected via the drive shaft 19 to the drive machine and is provided as a constant pump for delivering in only one direction. To this end, the feed pump 32 draws in hydraulic fluid from the tank volume 18 via a feed pump suction line 33 and delivers it into a feed pressure line 34. For limiting the maximum available feed pressure, the feed pressure line 34 is protected by a feed pressure control valve 35. The feed pressure control valve 35 is acted upon by a compression spring in the direction of its closed position.

In the opposing direction, the pressure prevailing in the feed pressure line 34 acts on a measuring area of the feed pressure control valve 35. If the feed pressure in the feed pressure line 34 exceeds a critical value predetermined by the compression spring, due to the hydrostatic force the feed pressure control valve 35 is adjusted in the direction of its open position. In the open position, the feed pressure line 34 is connected via a further relief line 36 to the internal tank volume 18'.

The feed pressure line 34 of the feed device 31 is, moreover, connected via a first feed line 37 to the first working line 9. Moreover, the feed pressure line 34 is connected to the second working line 10 via a second feed line 38. In the first feed line 37 and in the second feed line 38 a first and/or a second non-return valve 39, 40 are arranged. The two non-return valves 39, 40 are arranged in the first feed line 37 and/or the second feed line 38, such that they open in the direction of the first working line 9 and/or towards the second working line 10. If the pressure set by the feed pressure control valve 35 in the feed device 31 exceeds the pressure in the first working line 9 and/or in the second working line 10, hydraulic fluid is supplied from the feed device 31 into the first working line 9 and/or the second working line 10.

A second connecting line 41 and/or a third connecting line 42 is provided parallel to the first feed line 37 and/or the second feed line 38. The second connecting line 41 connects the first working line 9 to the feed pressure line 34. A first pressure control valve 43 is provided in the second connecting line 41. The first pressure control valve 43 is, in a similar manner to the feed pressure control valve 35, pretensioned in the direction of its closed position by means of a compression spring. The first working pressure prevailing in the first working line 9 acts in the opposing direction on the first pressure control valve 43. If the first working pressure exceeds the maximum pressure set by the compression spring, the first pressure control valve 43 is moved into its open position. In the open position of the pressure control valve 43, the first working line 9 is connected to the feed pressure line 34. As a result, when exceeding a critical pressure in the first working line 9, the first working line 9 is relieved in the direction of the feed device 31. In the same manner, in the third connecting line 42 a second pressure control valve 44 is arranged which, when exceeding a critical pressure in the second working line 10, relieves the second working line 10 into the feed device 31.

During a displacement of the working piston 3, the resulting volumetric flows from/into the first and/or second working chambers 7, 8 are at a ratio fixed by the ratio of the piston surfaces 4, 5. If the ratio of the total delivery volume of the first and second hydraulic pumps 11, 12 differs relative to the delivery volume of the second hydraulic pump 12, a volumetric flow equalisation is necessary.

For removing hydraulic fluid from the first and/or the second working line 9 and/or 10 for volumetric flow equalisation, a tapping valve is provided in the hydrostatic drive 1. In the preferred embodiment shown, the tapping valve is designed as a flush valve 45. The flush valve 45 is designed as a 3/3-way valve. An outlet connection of the flush valve 45 is connected to the feed pressure line 34. The flush valve 45 is retained in its central position by a first centring spring 48 and a second centring spring 49. The two inlet connections of the flush valve 45 are connected via a first tapping line 46 and/or a second tapping line 47 to the first working line 9 and/or the second working line 10. A first line branch 50 branches off from the first tapping line 46, which acts upon a measuring area on the flush valve 45 with the pressure of the first working line 9. The hydrostatic force produced by the first working pressure on the measuring area, acts in the same direction as the first centring spring on the flush valve 45 and acts thereon in the direction of a first switching position.

In the first switching position of the flush valve 45, the second tapping line 47 is connected to the feed pressure line 34. Thus a connection of the second working line 10 into the feed device 31 is created which may be passed through. The flush valve 45 is, in the embodiment shown, of symmetrical construction. Accordingly, a second line branch 51 is provided, which connects the second tapping line 47 to a further measuring area of the flush valve 45, the second working pressure acting there on the flush valve 45 in the same direction as the second centring spring 49. If the resulting force thus produced exceeds the force produced in the opposing direction by the first working pressure and the first centring spring 48, the flush valve 45 is moved into its second switching position. In the second switching position a connection between the first tapping line 46 and the feed pressure line 34 is created which may be passed through.

For the subsequent embodiments, it is accepted that the first piston surface 4 and the second piston surface 5 are at a ratio relative to one another which is slightly less than 2. For example, the area ratio of the first piston surface 4 to the second piston surface 5 is 1.8 to 1.9:1. Such area ratios are typical for conventional dual-acting hydraulic cylinders, such as are used, for example, for producing the actuating force on an arm and a boom of an excavator.

If hydraulic fluid is delivered into the first working line 9 by the first hydraulic pump 11 and the second hydraulic pump 12, a pressure difference in the first working line 9 and the second working line 10 is produced by the effect of the load. As a result of the first working pressure, which is greater than the second working pressure in the second working pressure line 10, the flush valve 45 is moved into its first switching position. In the first switching position, in the aforementioned manner, the second working line 10 is connected to the feed pressure line 34. In the disclosed embodiment, a first volumetric flow $V_7$ into the first working chamber 7 is produced. At the same time a volume flow in the order of $V_8$ flows out of the second working chamber 8. The volumetric flows are, relative to one another, at the ratio $$\frac{V_7}{V_8} = 1.8.$$

As the two partial volumetric flows produced by the first hydraulic pump 11 and the second hydraulic pump 12 are of the same size, only a partial volumetric flow in the order of $0.9 \cdot V_8$ is drawn in by the first and the second hydraulic pumps 11, 12. This produces a total volumetric flow on the delivery side of $2 \cdot 0.9V_8 = 1.8V_8$, which is delivered into the first working chamber 7. As, however, by means of the flush valve 45 the second working line 10 is connected to the feed pressure line 34, the difference in volumetric flow ($0.1 \cdot V_8$) which is required as a result of balancing the amounts of oil, may be diverted into the feed device 31. The feed device 31 may, in a manner not shown, be connected to the tank volume 18, which generally serves as a hydraulic fluid reservoir. To this end, the first connecting line 28 is connected via an equalisation line 52 to the suction line 17. In the equalisation line 52 a non-return valve 53 is arranged which opens in the direction of the suction line 17.

The ratio of the total delivery volume of the hydraulic pumps 11, 12 to the delivery volume of the second hydraulic pump 12 differs from the area ratio of the first piston surface 4 to the second piston surface 5. The resulting difference in volumetric flow is diverted via the tapping valve, which is configured in the embodiment shown as a flush valve 45. Delivery in the reverse direction, however, has the result that the hydraulic fluid volume drawn out of the first working chamber 7 by the first hydraulic pump 11 and the second hydraulic pump 12 is too small relative to the volumetric flow flowing into the second working chamber 8. In this case, by means of the feed pump 32 and the opening first non-return valve 39, hydraulic fluid is supplied on the current suction side of the first hydraulic pump 11 and the second hydraulic pump 12.

A flush valve is generally provided in a closed hydraulic circuit in order to withdraw specific hydraulic fluid from the circuit. This withdrawn hydraulic fluid is replaced by hydraulic fluid supplied by the feed device 31. The withdrawn hydraulic fluid is cooled before it is supplied into the circuit again. As a result of the flush valve 45, the working line 9 or 10 conducting the lower pressure is connected to the feed device 31. In the embodiment shown, the flush valve 45 is a hydraulically actuated 3/3-way valve.

The use of a flush valve 45 as a tapping valve allows the connection of any hydraulic cylinder 2. In particular, due to the symmetry of the flush valve 45 it is possible to operate the hydraulic pump unit 30 with any hydraulic cylinder 2. Thus the first piston surface 4 may also be at the ratio of, for example, 2.2:1 relative to the second piston surface 5. In this case, the withdrawal and/or the supply of hydraulic fluid when actuating the hydrostatic drive 1 is reversed. If, therefore, by means of the first hydraulic pump 11 and the second hydraulic pump 12 hydraulic fluid is delivered into the first working chamber 7, an amount of hydraulic fluid is additionally delivered into the second working line 10 by the feed pump 32 at an area ratio of 2.2:1. With the reverse delivery direction, however, hydraulic fluid is passed from the first working pressure line 9 by means of the flush valve 45, into the feed device 31 and finally into the tank volume 18. By the use of the flush valve 45 with its symmetrical link to the first working line 9 and the second working line 10, therefore, a single hydraulic pump unit 30 may be used, to which any hydraulic cylinder 2 may be attached.

Figure 2:
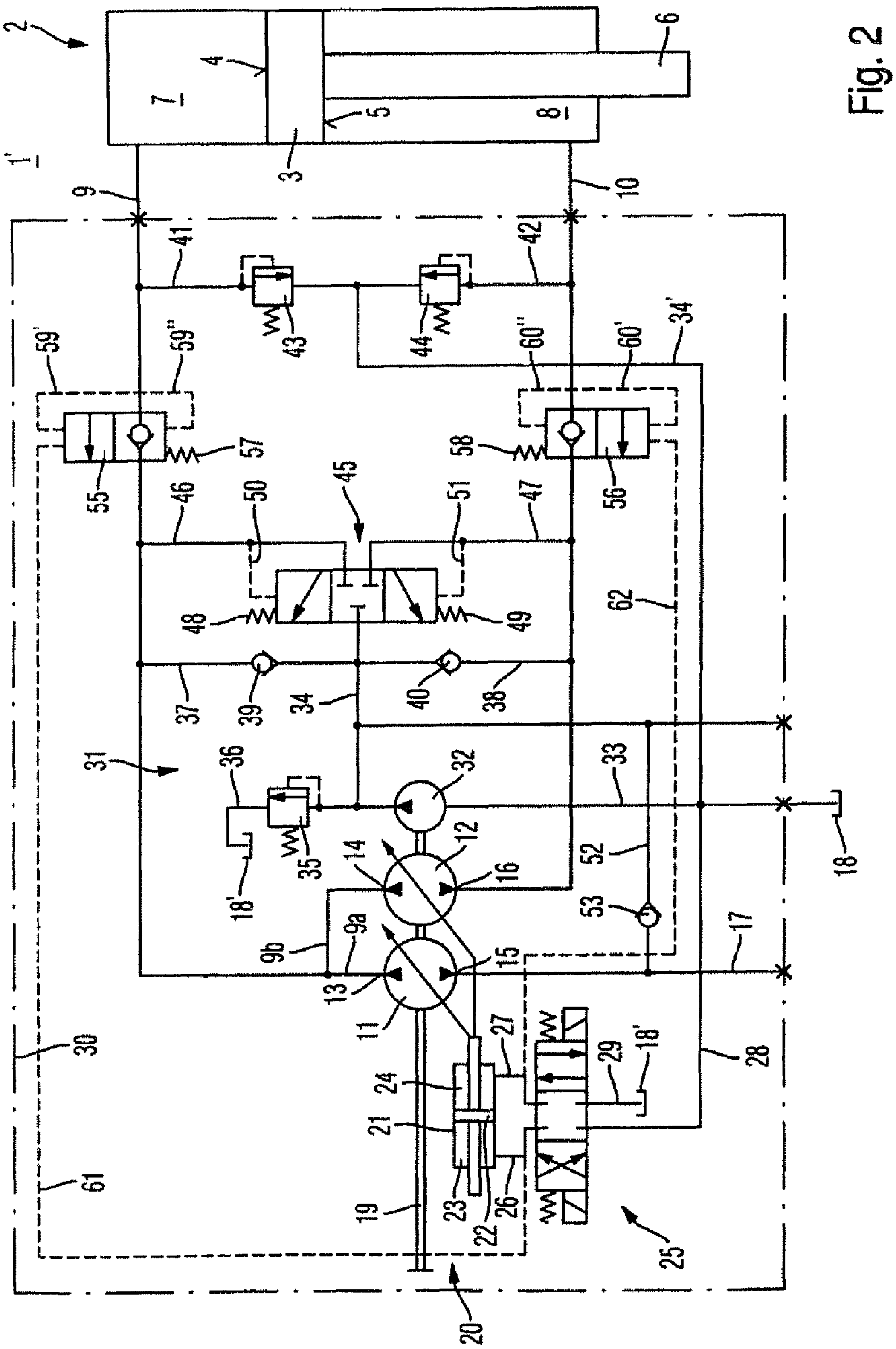
FIG. 2 shows a second embodiment of a hydrostatic drive according to the invention comprising load maintaining valves.

In FIG. 2 a second embodiment of the hydrostatic drive 1' according to the invention is shown. The components coinciding with the elements of the first embodiment are provided with the same reference numerals, so that a further detailed description may be omitted. In contrast to the first embodiment of FIG. 1, in the first working line 9 and in the second working line 10, one respective load maintaining valve 55, 56 is provided. The first load maintaining valve 55 is arranged in the first working line 9. Accordingly, the second load maintaining valve 56 is arranged in the second working line 10. The two load maintaining valves 55, 56 are of identical construction. The first load maintaining valve 55 is retained by a first pretensioning spring 57 in its initial position. In the initial position of the first load maintaining valve 55 a connection of the first working line 9 is created which may be passed through in one direction. This is achieved by a non-return valve function of the first load maintaining valve 55 in its initial position. If, however, the first load maintaining valve 55 is moved into its second switching position, a connection is possible which may be passed through in the opposing direction.

The non-return valve in the initial position of the first load maintaining valve 55 opens in the direction of the first working chamber 7 and closes with a volumetric flow directed out of the first working chamber 7. The first load maintaining valve 55 is also pressure-compensated, as is the second load maintaining valve 56, in order to allow an adjustment of the load maintaining valves 55, 56 counter to the force of the first and/or second pretensioning spring 57, 58. To this end, respectively, the working pressure prevailing on the first working chamber 7 and/or the second working chamber 8, acts both in the same direction as the first and/or the second pretensioning spring 57, 58 and in the opposing direction on the first and/or second load maintaining valve 55, 56. The surfaces acted upon by pressure in the opposing direction of the first load maintaining valve 55 and/or of the second load maintaining valve 56 differ, however, so that a slight adjustment of the load maintaining valves 55, 56 into their respective second switching position is possible. For supplying the working pressures of the first working line 9, first equalisation lines 59', 59'' are provided. Accordingly, second equalisation lines 60', 60' are provided on the second load maintaining valve 56.

A first control line 61 is provided in order to move the first load maintaining valve 55 from its initial position counter to the force of the first pretensioning spring 57 into its second switching position. The first control line 61 connects the first load maintaining valve 55 to the first actuating pressure line 26. In the same manner, the second actuating pressure line 27 is connected via a second control line 62 to the second load maintaining valve 56.

In the embodiment shown, the two load maintaining valves 55, 56 are hydraulically actuated. It is, however, also possible in an alternative embodiment to activate the load maintaining valves electrically. The activation by an appropriate control signal takes place, therefore, according to the activation of the actuating pressure regulating valve 25.

Whilst in the first embodiment of FIG. 1 the first tapping line 46 and the second tapping line 47 are connected to the first working line 9 and/or the second working line 10 relative to the first pressure control valve 43 and the second pressure control valve 44 on the portion oriented towards the hydraulic cylinder 2, the arrangement in the embodiment according to FIG. 2 is inverted. Proceeding from the hydraulic cylinder 2, the second connecting line 41, the first tapping line 46 and the first feed line 37 are connected in series to the first working line 9. The first load maintaining valve 55 is, therefore, arranged between the connection points of the first tapping line 46 and the second connecting line 41. The arrangement relative to the second working line 10 corresponds thereto.

The altered arrangement is also taken into account in that the second and third connecting line 41, 42, via a feed pressure line portion 34', and the first connecting line 28 are connected to the feed pressure line 34.

As a result of the provision of the first load maintaining valve 55 and the second load maintaining valve 56 in the first working line 9 and/or the second working line 10 it is possible to clamp hydraulically the working piston 3 in any position and thus to prevent any undesired movement. In the initial position of the first load maintaining valve 55 and the second load maintaining valve 56, an escape of hydraulic fluid from the first working chamber 7 and/or the second working chamber 8 is not possible due to the non-return valve arranged in the load maintaining valve 55, 56. As soon as the actuating piston 22 returns into its initial position, and the actuating pressure chambers 23, 24 are relieved, insufficient control pressure bears via the first control line 61 and the second control line 62 on the first load maintaining valve 55 and the second load maintaining valve 56, in order to move the respective load maintaining valve 55 and/or 56 into its open position. If, however, an actuating pressure chamber of the adjusting device 20 is acted upon by an actuating pressure, the first load maintaining valve 55 is moved into its second switching position when the first actuating pressure chamber 23 is acted upon via the first control line 61, and hydraulic fluid is able to flow out from the first working chamber 7. If the adjusting device 20 is acted upon in the opposing direction for producing a reverse delivery direction, the first load maintaining valve 55 again returns into its initial position due to the force of the first pretensioning spring 57. At the same time, the second load maintaining valve 56 opens and releases a flow path for the outflow of hydraulic fluid from the second working chamber 8 into the second working line 10.

With purely single-sided use, for example the hydraulic lifting of loads, in which in the stationary state an outflow is only to be anticipated from one of the two working chambers 7, 8, it is also possible to provide just one load maintaining valve 55 or 56 in the appropriate working line 9, 10.

Figure 3:
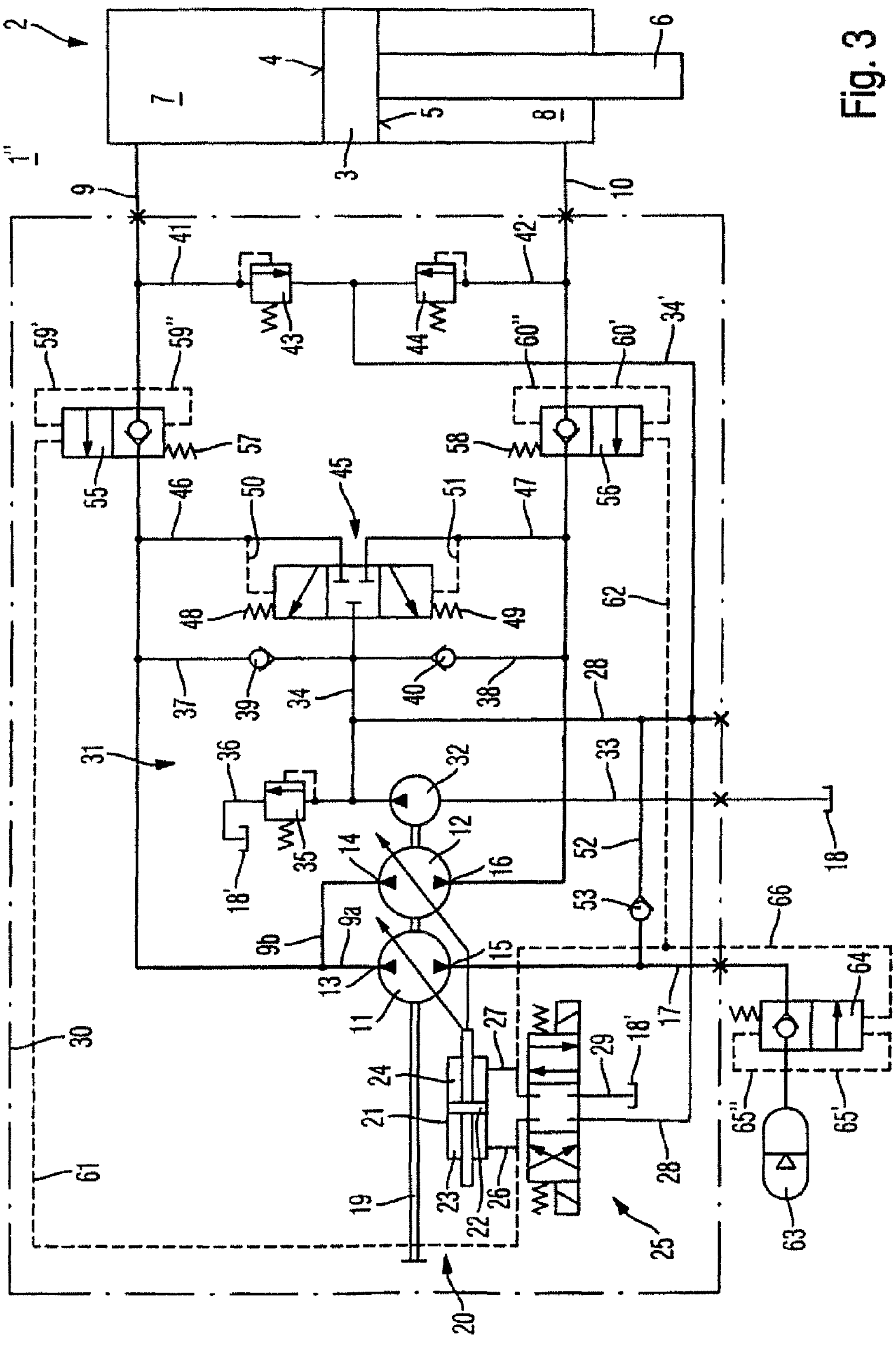
FIG. 3 shows a third embodiment of a hydrostatic drive according to the invention comprising a hydraulic accumulator as a hydraulic fluid reservoir.

Proceeding from the second embodiment of FIG. 2, the embodiment according to FIG. 3 is developed such that the suction line 17 of the first hydraulic pump 11 is connected to a hydraulic accumulator 63 as a hydraulic fluid reservoir. In the suction line 17 between the hydraulic accumulator 63 and the first hydraulic pump 11 a non-return valve 64 is preferably arranged. The non-return valve 64 is in turn pressure-compensated via third equalisation lines 65', 65". The activation of the non-return valve 64 takes place via a third control line 66 which branches off from the second control line 62. The non-return valve 64 is moved into its open position during a delivery of hydraulic fluid in the direction of the first working chamber 7. In an alternative embodiment, the non-return valve 64 may also be electrically activated, as are the two load maintaining valves 55, 56.

The use of a hydraulic accumulator 63 which, for example, is designed as a hydraulic membrane accumulator has the advantage that, when hydraulic fluid is delivered from the first working chamber 7 in the direction of the second working chamber 8, it is not only the second hydraulic pump 12 which has to operate against a counter pressure but, due to the hydraulic accumulator 63, the first hydraulic pump 11 also has to deliver hydraulic fluid counter to a pressure. This improves the uniformity of the load for the first hydraulic pump 11 and the second hydraulic pump 12. Additionally with the removal of hydraulic fluid from the first working chamber 7 the possibility is provided of storing a portion of the energy being released, in the form of pressure energy in the first hydraulic accumulator 63, for example when lowering a load. With a reversal of the delivery direction, said pressure energy is released so that only a reduced pressure difference has to be produced by the first hydraulic pump 11.

Figure 4:
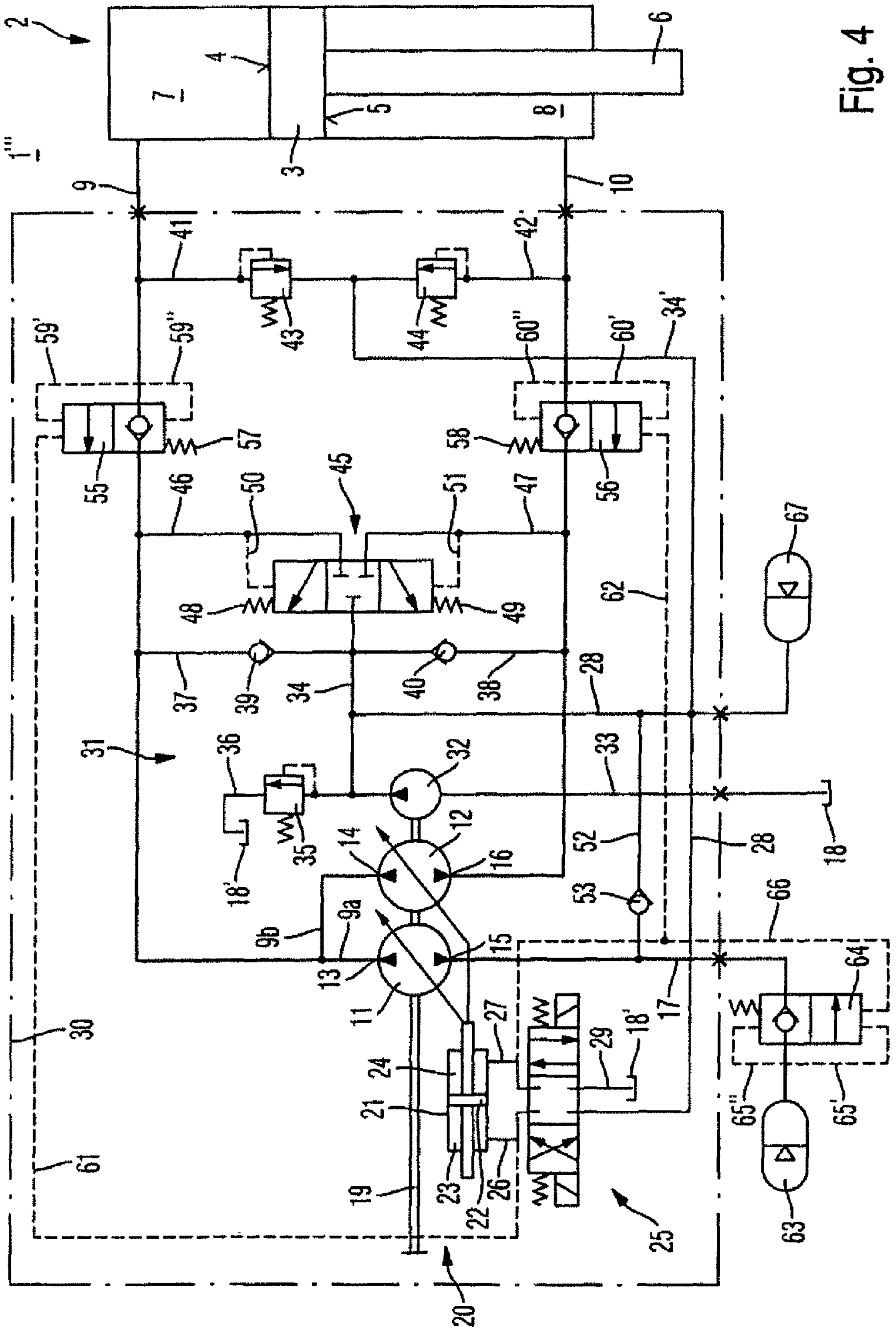
FIG. 4 shows a fourth embodiment of a hydrostatic drive according to the invention comprising an additional hydraulic accumulator for reducing pressure fluctuations.

Proceeding from the embodiment of FIG. 3, a second hydraulic accumulator 67 is provided in FIG. 4. The first connecting line 28 is connected to the second hydraulic accumulator 64. The second pressure accumulator 67 serves to reduce pressure fluctuations in the feed device 31. Such pressure fluctuations may occur, in particular, at low rotational speeds of the drive machine, as the amount of hydraulic fluid delivered by the feed pump 32 directly corresponds to the rotational speed of the drive machine.

The invention is not limited to the embodiments shown. Advantageous combinations of individual features shown in the different embodiments are also possible.

The invention claimed is:

1. A hydrostatic drive comprising:

a first hydraulic pump;

a second hydraulic pump; and a dual-acting hydraulic cylinder comprising a working piston, which defines a first working chamber comprising a first piston surface of the working piston and a second working chamber comprising a second piston surface of the working piston, the first and the second hydraulic pumps being connected by their respective first connections to the first working chamber, the first hydraulic pump being connected by its second connection to a hydraulic fluid reservoir and the second hydraulic pump being connected by its second connection to the second working chamber, wherein the hydraulic pumps are driven via a common drive shaft by a drive machine and the hydraulic pumps are configured to deliver hydraulic fluid in a first delivery direction and in a reverse delivery direction, wherein the drive comprises: a feed pump connected via the drive shaft to the drive machine for volumetric flow equalisation when the delivery direction of the first and second hydraulic pumps is reversed; and a feed pressure line protected by a feed pressure control valve for limiting the maximum available feed pressure of the feed pump, and wherein the drive comprises a tapping valve, an outlet connection of the tapping valve being connected to the feed pressure line for removing hydraulic fluid in the first delivery direction of the hydraulic pumps.

2. The hydrostatic drive according to claim 1, wherein the ratio of the first piston surface to the second piston surface differs from the ratio of the sum of the delivery volumes of the two hydraulic pumps relative to the second delivery volume of the second hydraulic pump.

3. The hydrostatic drive according to claim 1, wherein the second connection of the first hydraulic pump is connected to a hydraulic fluid reservoir and, by means of the tapping valve, the first working chamber or the second working chamber is capable of being connected to the hydraulic fluid reservoir.

4. The hydrostatic drive according to claim 1, wherein the tapping valve is a flush valve which, depending on a working pressure prevailing in the first and the second working chamber, connects the first or the second working chamber to the hydraulic fluid reservoir.

5. The hydrostatic drive according to claim 4, wherein the flush valve connects the first or the second working chamber via a feed device to the hydraulic fluid reservoir.

6. The hydrostatic drive according to claim 1, wherein the delivery volume of both the first and the second hydraulic pump is settable.

7. The hydrostatic drive according to claim 1, wherein the first and the second hydraulic pump both form a hydraulic pump unit.

8. The hydrostatic drive according to claim 1, wherein: the tapping valve is connected via a first working line to the first working chamber and/or via a second working line to the second working chamber; and a load maintaining valve is provided in at least one of the first working line and the second working line.

9. The hydrostatic drive according to claim 8, wherein the delivery volume of the first and the second hydraulic pumps is capable of being altered by an adjusting device which is capable of being acted upon by at least one first actuating pressure and the at least one load maintaining valve is capable of being acted upon by the at least one actuating pressure in the opening direction.

10. The hydrostatic drive according to claim 8, wherein the at least one load maintaining valve is pressure-compensated.

11. The hydrostatic drive according to claim 1, wherein the hydraulic fluid reservoir is a hydraulic accumulator.

12. The hydrostatic drive according to claim 11, wherein, between the hydraulic accumulator and the first hydraulic pump, a non-return valve is arranged which is capable of being acted upon by an actuating pressure of an adjusting device.

13. The hydrostatic drive according to claim 1, wherein the tapping valve is arranged in a hydraulic pump unit comprising the first and the second hydraulic pump.

14. The hydrostatic drive according to claim 8, wherein the at least one load maintaining valve is arranged in a hydraulic pump unit comprising the first and the second hydraulic pump.

15. The hydrostatic drive according to claim 12, wherein the non-return valve is arranged in a hydraulic pump unit comprising the first and the second hydraulic pump.

* * * * *